April 14, 1942.   L. D. HAGENBOOK   2,280,043
SELF LOADING DEVICE FOR SHAKER CONVEYERS
Filed Dec. 24, 1940   10 Sheets-Sheet 1
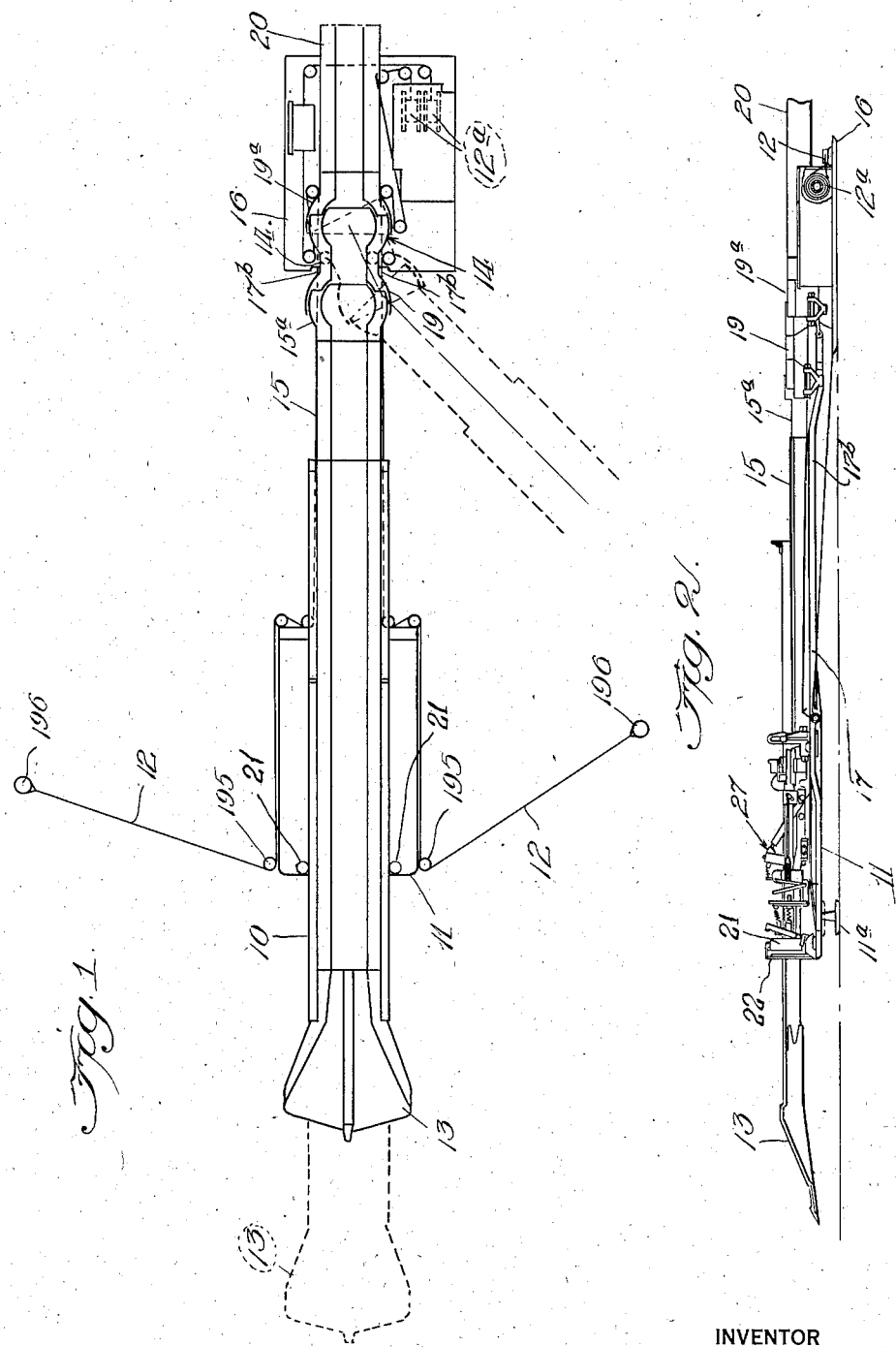
INVENTOR
*Troy D. Hagenbook*
BY
*Clarence F. Poole*
ATTORNEY April 14, 1942.  L. D. HAGENBOOK  2,280,043
SELF LOADING DEVICE FOR SHAKER CONVEYERS
Filed Dec. 24, 1940  10 Sheets-Sheet 2
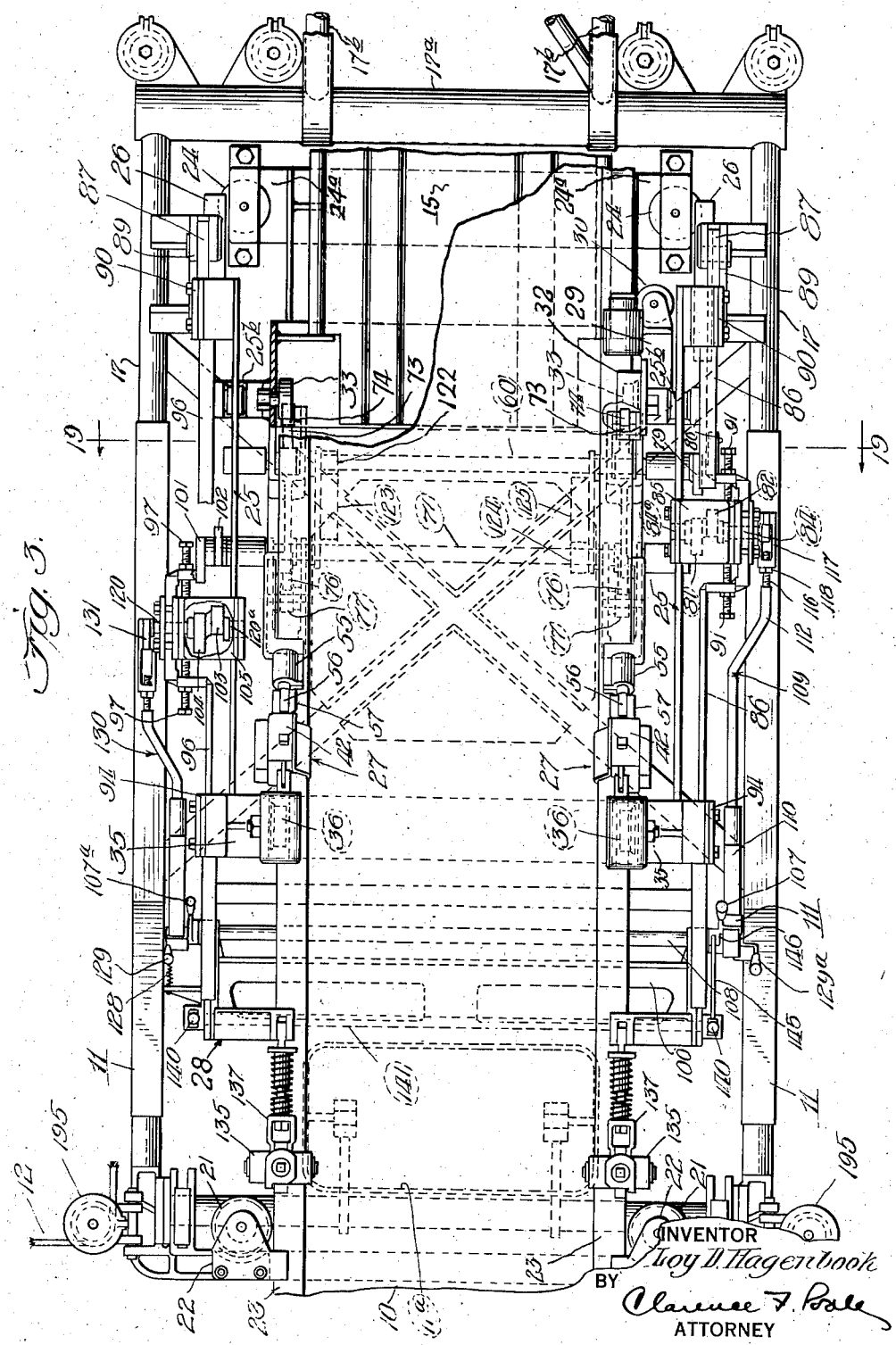

April 14, 1942.　　　L. D. HAGENBOOK　　　2,280,043
SELF LOADING DEVICE FOR SHAKER CONVEYERS
Filed Dec. 24, 1940　　　10 Sheets-Sheet 3
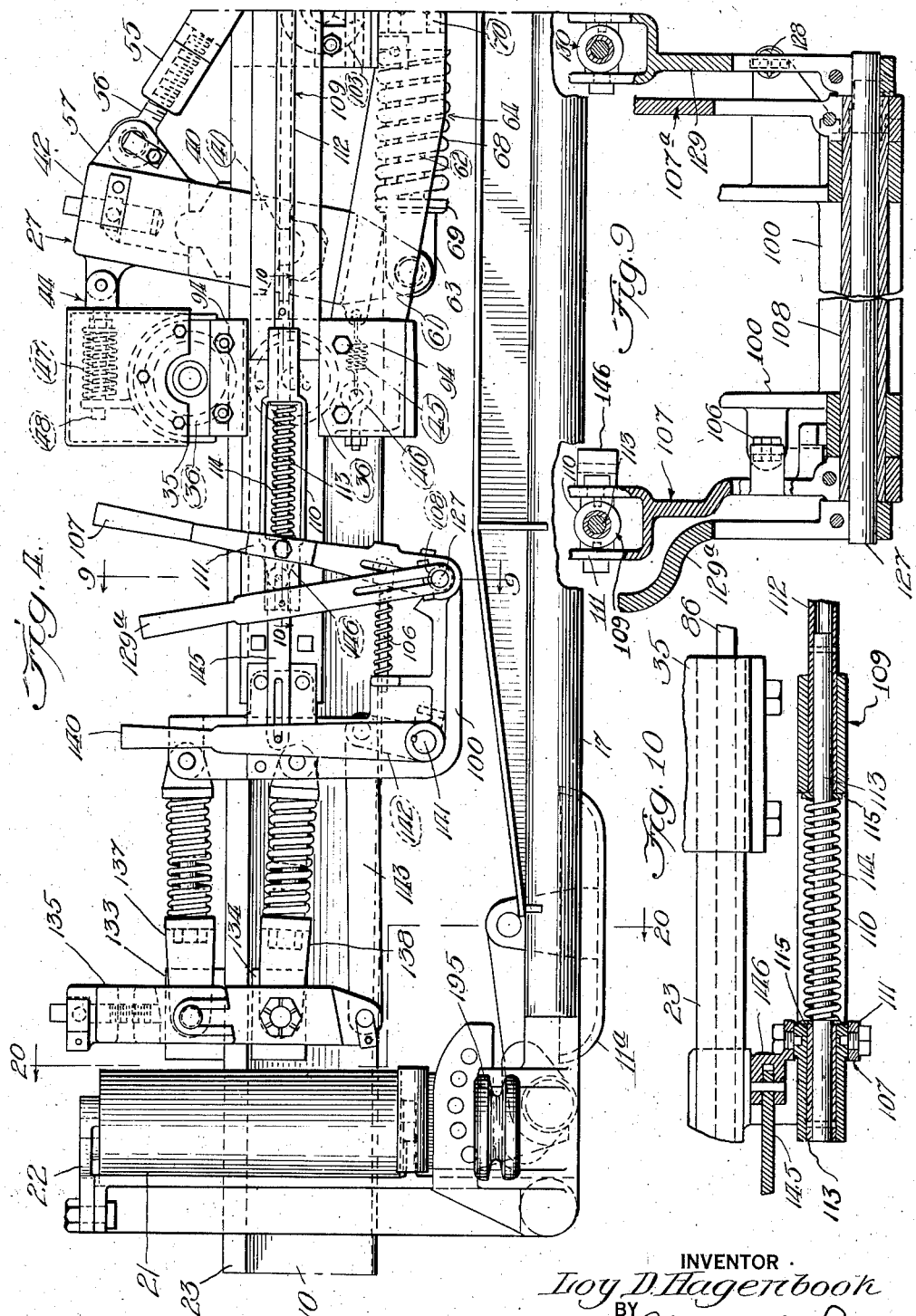
INVENTOR
Troy D. Hagenbook
BY Clarence F. Poole
ATTORNEY April 14, 1942.  L. D. HAGENBOOK  2,280,043
SELF LOADING DEVICE FOR SHAKER CONVEYERS
Filed Dec. 24, 1940  10 Sheets-Sheet 4
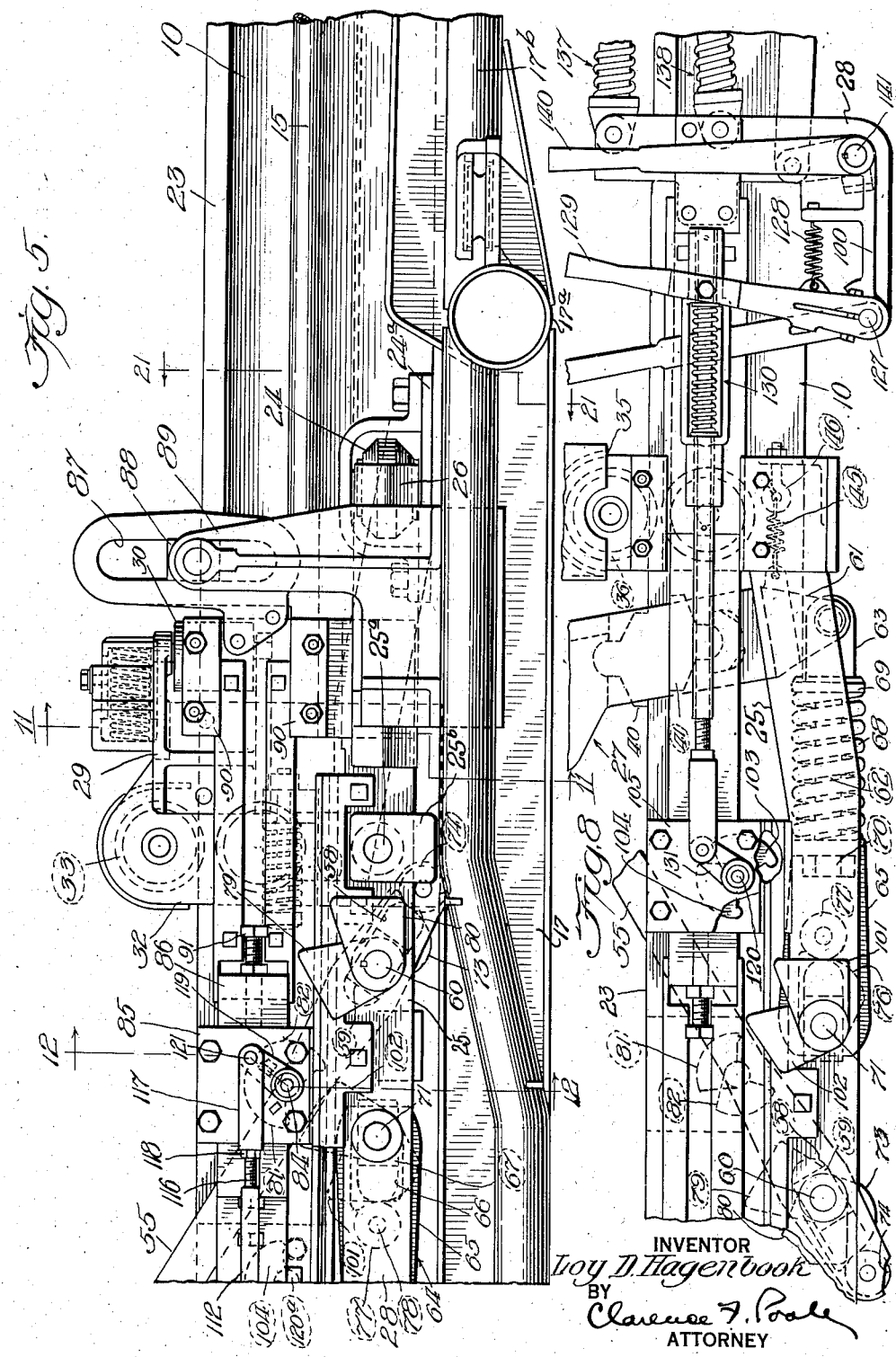
INVENTOR
Loy D. Hagenbook
BY
Clarence F. Poole
ATTORNEY

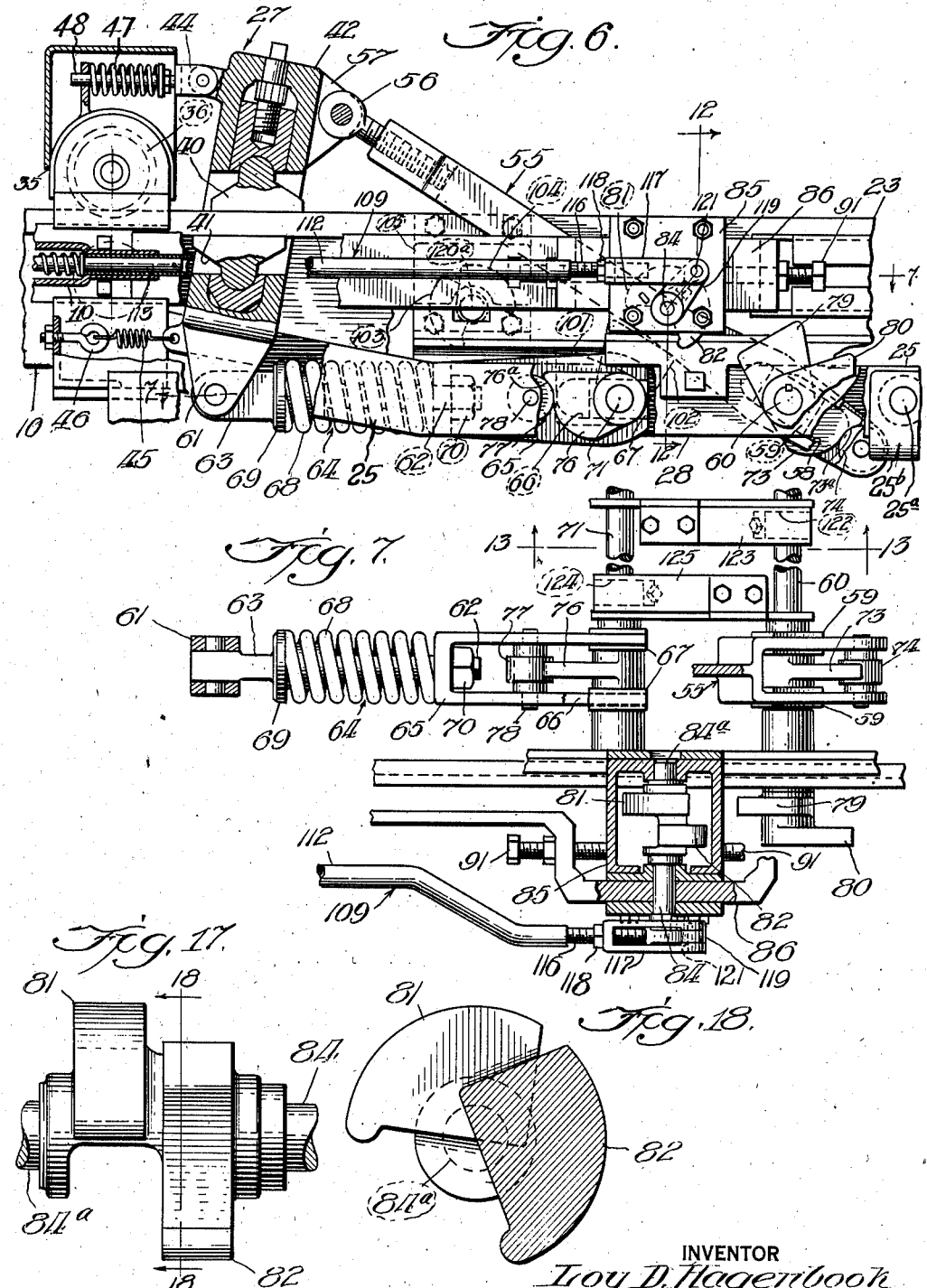

April 14, 1942.   L. D. HAGENBOOK   2,280,043
SELF LOADING DEVICE FOR SHAKER CONVEYERS
Filed Dec. 24, 1940    10 Sheets-Sheet 6
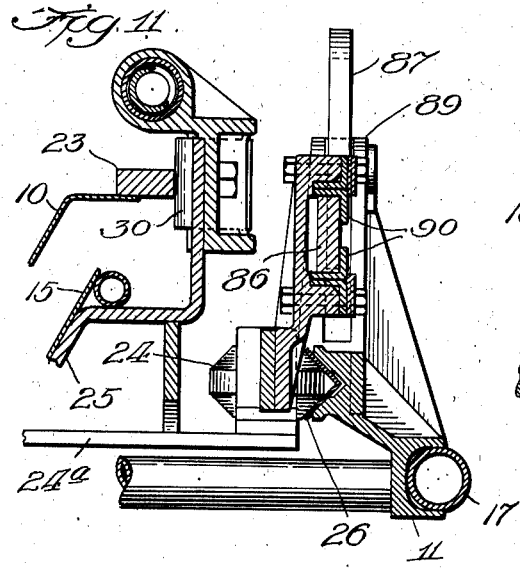
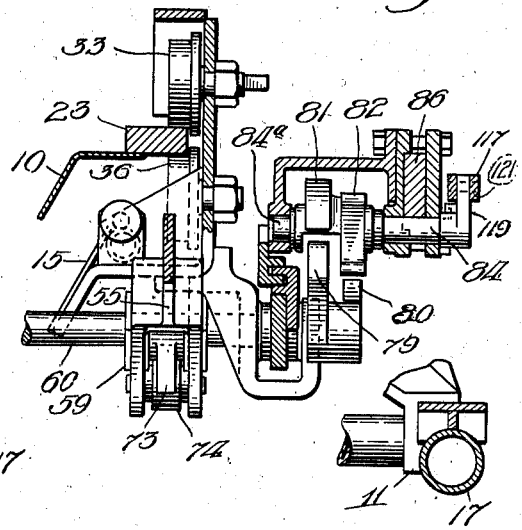
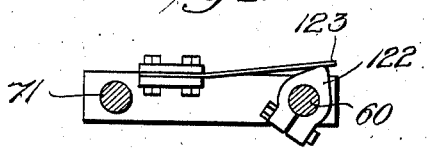
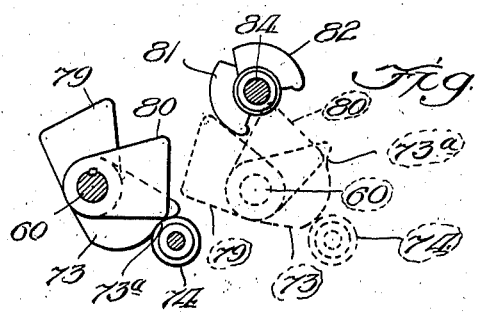
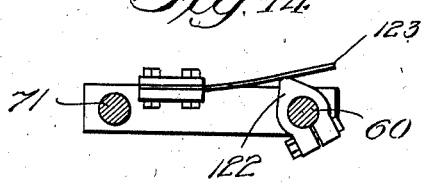
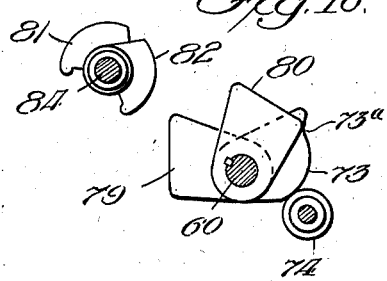
INVENTOR
Loy D. Hagenbook
BY Clarence F. Poole
ATTORNEY April 14, 1942.     L. D. HAGENBOOK     2,280,043
SELF LOADING DEVICE FOR SHAKER CONVEYERS
Filed Dec. 24, 1940         10 Sheets-Sheet 7
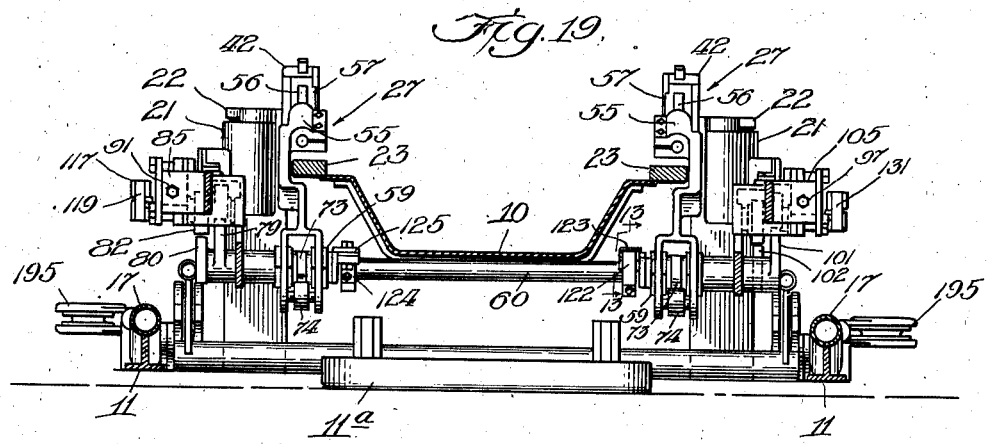
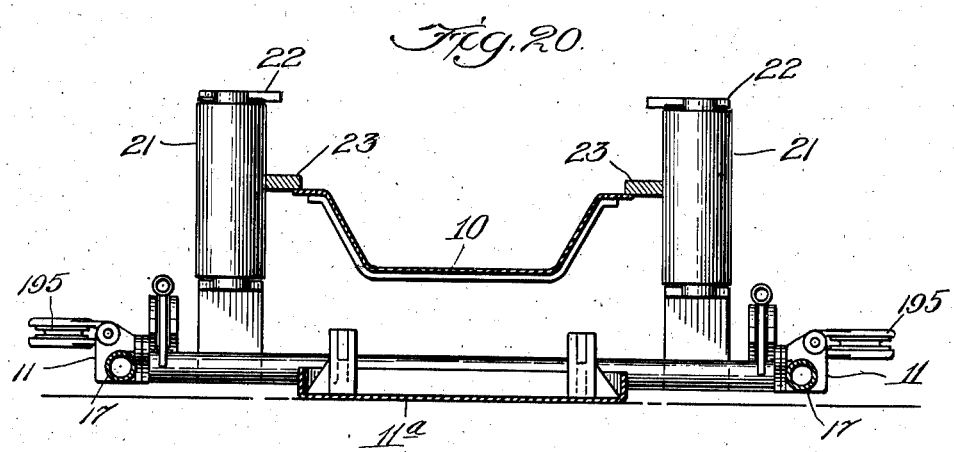
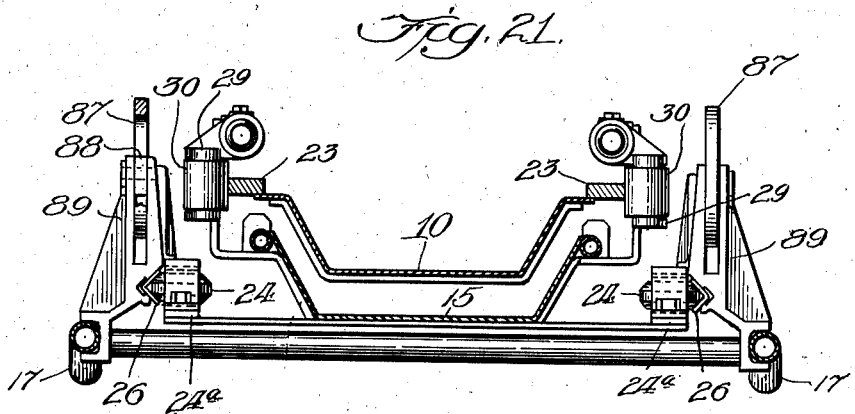
INVENTOR
Loy D. Hagenbook
BY
Clarence F. Poole
ATTORNEY

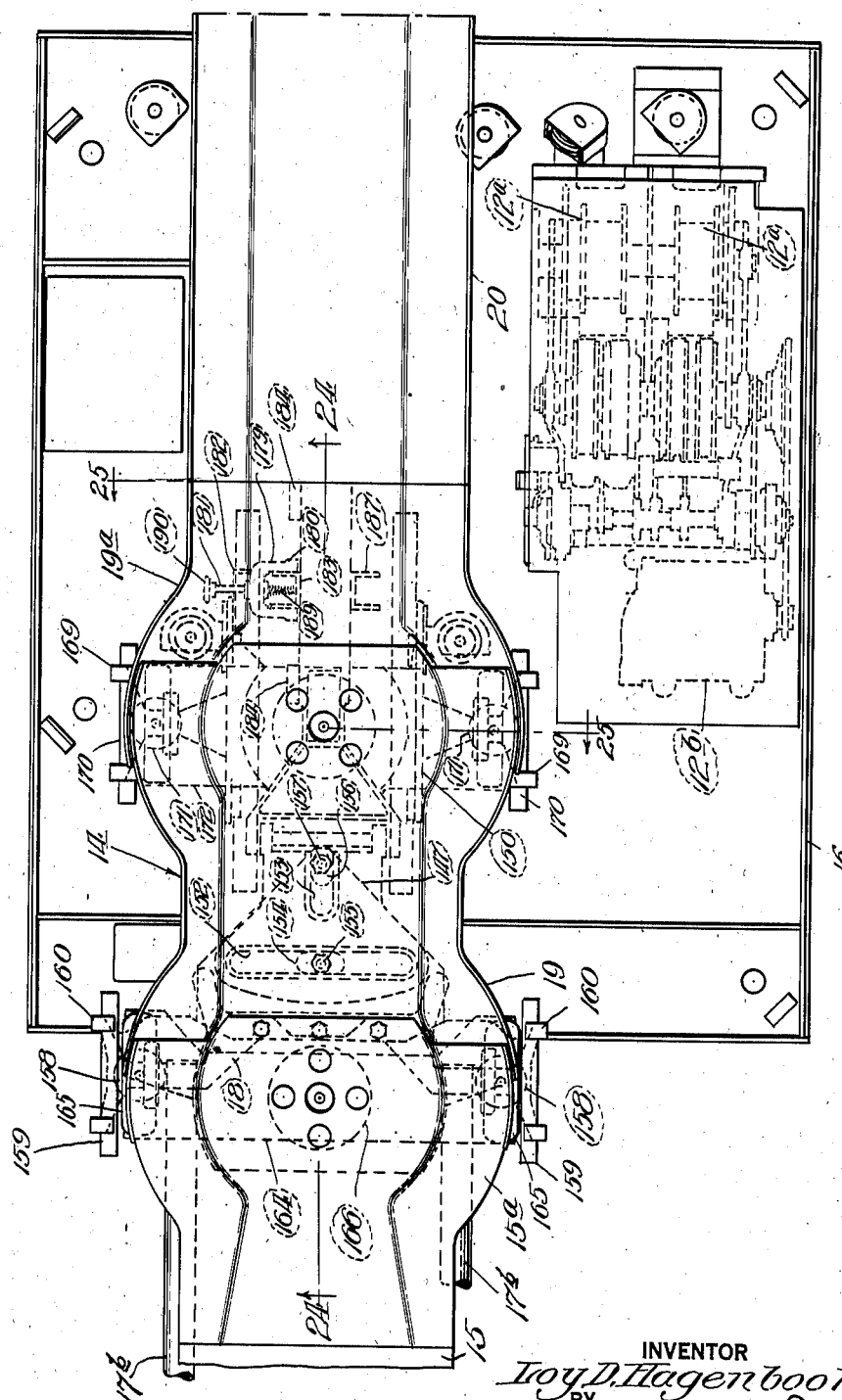

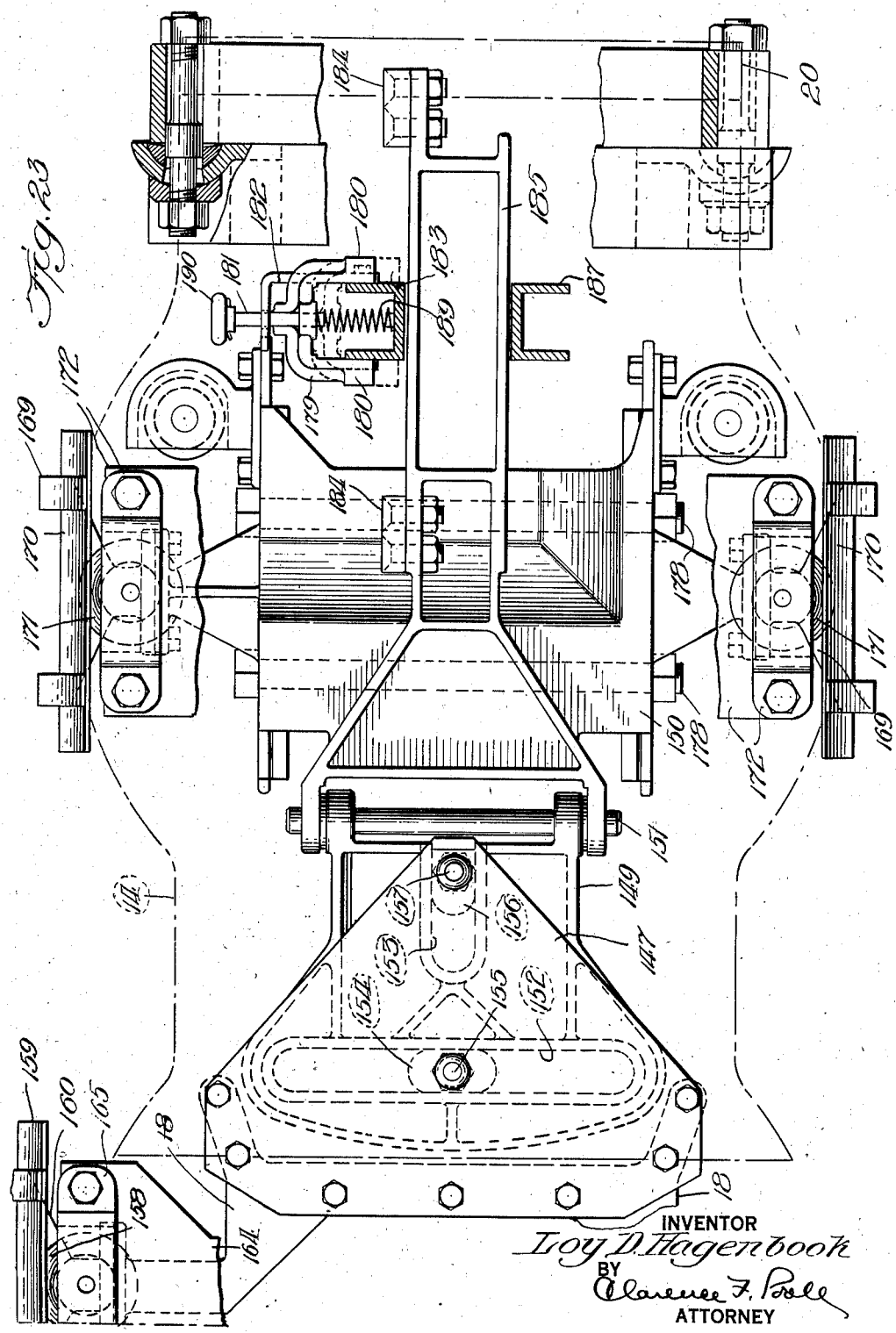

April 14, 1942. L. D. HAGENBOOK 2,280,043
SELF LOADING DEVICE FOR SHAKER CONVEYERS
Filed Dec. 24, 1940 10 Sheets-Sheet 10
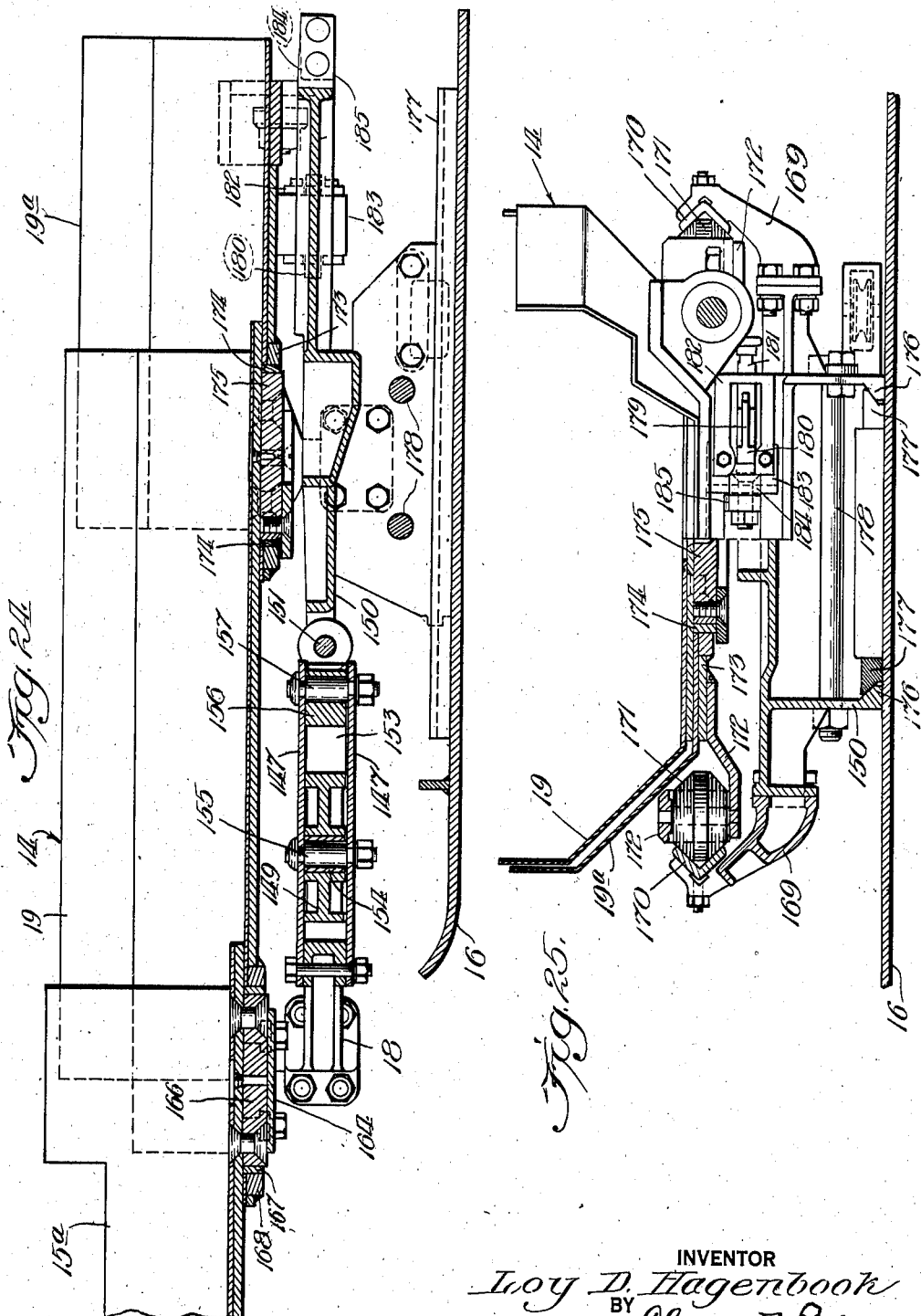
INVENTOR
Loy D. Hagenbook
BY
Clarence F. Poole
ATTORNEY Patented Apr. 14, 1942

2,280,043

UNITED STATES PATENT OFFICE 2,280,043

SELF-LOADING DEVICE FOR SHAKER CONVEYERS

Loy D. Hagenbook, Chicago, Ill., assignor to Goodman Manufacturing Company, Chicago, Ill., a corporation of Illinois Application December 24, 1940, Serial No. 371,553

35 Claims. (Cl. 198—14)

This invention relates to improvements in self-loading devices for shaker conveyers of the type utilized for picking up and transporting loose material such as coal, rock, or the like.

The principal objects of my invention are to provide a novel and efficient form of self-loading device of the class described, adapted to have communication with the forward end of a shaker conveyer trough line and including a reciprocating and extensible trough section with a shovel on the forward end thereof, supported and arranged in a new and improved manner so it may be swung from side to side by power and the shovel and extensible trough section may be extended into or retracted from the material it is desired to load by the action of the conveyer.

Another object of my invention is to provide a novel form of self-loading device for a shaker conveyer including a swivel mounted on a base and having connection with the rear end of a reciprocating trough section having a pick-up member nested therein, and a supporting and guiding mounting for said reciprocating trough section and pick-up member, mounted for slidable movement along the ground and connected with said swivel, for lateral swinging movement with respect thereto, together with power means having operative connection with said supporting and guide mounting, for laterally swinging said reciprocating and extensible trough sections about said base.

A further object of my invention is to provide a new and improved form of feeding device of the friction grip type adapted to automatically extend or retract an extensible trough section of a shaker conveyer, and arranged with a view towards a simplified and safe control of the feeding device.

Another object of my invention is to provide a novel and improved form of feeding device of the class described, so arranged that no gripping reaction is taken on the control levers, for controlling extension or retraction of the extensible trough section, and said control levers are stationary during reciprocation of the conveyer.

A still further object of my invention is to provide a novel and improved form of self-loading device for a shaker conveyer including a novel form of supporting and guiding frame forming a reciprocable support for a pick-up member of the loading device, which is held from reciprocable movement during reciprocable movement of the conveyer and forms a mounting for the means for controlling feeding movement of said pick-up member, together with a novel form of centering means, for so positioning said frame with respect to the stroke of the conveyer that said control means will control feeding movement of the pick-up member at the proper part of the forward or return strokes of the conveyer.

Other objects of my invention will appear from time to time as the following specification proceeds and with reference to the accompanying drawings wherein:

Figure 1 is a diagrammatic plan view of a loading device constructed in accordance with my invention;

Figure 2 is a view in side elevation of the device shown in Figure 1;

Figure 3 is an enlarged fragmentary plan view of a portion of the loading device, showing certain details of the feeding mechanism;

Figures 4 and 5 are enlarged fragmentary views in side elevation of a portion of the device shown in Figures 1 and 2, particularly illustrating the construction of the feeding mechanism and control therefor;

Figure 6 is a partial fragmentary view of the feeding mechanism in side elevation, drawn to substantially the same scale as Figures 3 and 4, with certain parts broken away and certain other parts shown in longitudinal section, in order to more clearly illustrate certain details of the feeding mechanism;

Figure 7 is a fragmentary detail plan view of a portion of the feeding mechanism, with certain parts broken away and certain other parts shown in horizontal section;

Figure 8 is a fragmentary view in side elevation of the feeding device, looking at the opposite side thereof from Figure 4, in order to illustrate certain details of the invention not shown in Figure 4;

Figure 9 is a partial fragmentary transverse sectional view taken substantially along line 9—9 of Figure 4, drawn to an enlarged scale;

Figure 10 is a fragmentary horizontal sectional view taken substantially along line 10—10 of Figure 4;

Figure 11 is a fragmentary transverse sectional view taken substantially along line 11—11 of Figure 5;

Figure 12 is a fragmentary transverse sectional view taken substantially along line 12—12 of Figure 5;

Figure 13 is a fragmentary transverse sectional view taken substantially along line 13—13 of Figure 7;

Figure 14 is a view somewhat similar to Figure 13, but showing the parts in a different position;

Figure 15 is a diagrammatic view illustrating certain positions of the mechanism for positioning the feeding mechanism into a feeding or inoperative position;

Figure 16 is a view somewhat similar to Figure 11, but with the parts in a different position than in Figure 15;

Figure 17 is an enlarged view of one of the tripping cams;

Figure 18 is a sectional view taken substantially along line 18—18 of Figure 17;

Figure 19 is a transverse sectional view taken substantially along line 19—19 of Figure 3;

Figure 20 is a sectional view taken substantially along line 20—20 of Figure 4 and drawn to a reduced scale;

Figure 21 is a transverse sectional view taken substantially along line 21—21 of Figure 5;

Figure 22 is an enlarged fragmentary plan view of the rear portion of the device shown in Figures 1 and 2, illustrating certain details of the swivel and the power mechanism for swinging the feeding mechanism from side to side;

Figure 23 is an enlarged fragmentary detail view of the swivel shown in Figure 22, with the trough sections removed therefrom in order to illustrate certain details of the support therefor;

Figure 24 is a longitudinal sectional view taken substantially along line 24—24 of Figure 22; and Figure 25 is a fragmentary transverse sectional view taken substantially along lines 25—25 of Figure 22.

Referring now in particular to the drawings, the embodiment of my invention illustrated therein includes generally an extensible trough section 10 nested within a reciprocating trough section 15. A shovel 13 is provided at the forward end of said extensible trough section, for picking up loose material such as coal, rock, or the like from the ground. Said reciprocating and extensible trough sections are reciprocably supported and guided in an elongated frame 11, laterally slidable along the ground about a swivel 14, one a shoe 11a pivotally mounted at the forward end of said frame. Said frame may be adjustably mounted on said shoe, to adjust the height of the shovel 13 relative to the ground.

The swivel 14 is mounted on a base 16 spaced rearwardly of the frame 11, and is adapted to be held from movement with respect to the ground by means of jacks (not shown) interposed between said base and the mine roof, and will hereinafter be more fully described as this specification proceeds. A pair of flexible draft devices 12, 12 wound on winding drums 12a, 12a, mounted on the base 16 are provided to laterally swing said frame 11 and the trough sections carried thereby about the swivel.

The elongated frame 11 extends rearwardly from the forward portion of the reciprocating trough section 15, beneath said trough section, and includes a pair of parallel spaced arms 17, 17 spaced outwardly from and extending along opposite sides of said trough section for a portion of the length thereof. Said arms are connected at their rear ends to a member 17a extending transversely beneath said reciprocating trough section. A pair of parallel arms 17b, 17b are secured at their forward ends to said member, inwardly of said arms 17, 17, and extend rearwardly from said member to a cross frame member 18, to which they are secured. Said cross frame member is connected to and is a part of the swivel 14, which forms a connection between the frame 11 and the base 16 (see Figures 2, 22 and 23).

The swivel 14 includes generally a connecting trough section 15a connected to the rear end of the reciprocating trough section 15 by means of suitable connecting bolts (not shown). Said connecting trough section is slidably mounted on the cross frame member 18 for reciprocable movement with respect thereto, and the side walls thereof at the rear end of said trough section are of an outwardly flared formation and are curved to conform to the arc of swing of said connecting trough section. Said side walls are nested within outwardly flared correspondingly curved side walls of an intermediate trough section 19. Said trough sections are pivotally connected together to move about coaxial axes. Said intermediate trough section has outwardly flared curved side walls at the rear end thereof, which are nested within outwardly flared arcuate side walls of a rear connecting trough section 19a, pivotally connected to said intermediate trough section adjacent the rear end thereof. Said rear trough section is connected with and reciprocably driven from the forward end of a trough section 20 of the shaker conveyer trough line. The manner in which said intermediate and connecting trough sections are pivotally connected together and the support therefor will hereinafter be more clearly described as this specification proceeds.

The winding drums 12a, 12a, are separately driven from a motor 12b, in such a manner that one winding drum will wind in one draft device while the other winding drum pays out cable at the same rate of speed, to move the frame 11 and the reciprocating and extensible trough sections laterally about said swivel. The drive from said motor to said winding drums is clearly disclosed in a companion application Serial No. 371,552, filed Dec. 24, 1940, and is no part of my present invention, so will not herein be shown or described in detail. A pushbutton control (not shown) may be provided for said motor, which is so arranged that when one button is pushed said motor will rotate in one direction and drive one winding drum, to swing the extensible trough section in one direction, and when another button is pushed, said motor will rotate in an opposite direction and drive another winding drum, to swing said extensible trough section in an opposite direction.

Referring now in particular to the mounting for the reciprocating and extensible trough sections on the frame 11, a pair of laterally spaced guide rollers 21, 21 is mounted at the forward end of said frame, adjacent opposite sides thereof on upright brackets 22, 22, for rotation about parallel spaced vertical axes. Said guide rollers are adapted to engage the outer sides of bearing plates 23, 23, projecting laterally from and extending along the upper flanges of said extensible trough section, to form an antifriction guide means for said extensible trough section and to cause lateral movement of said extensible and reciprocating trough sections, upon lateral movement of said frame about the swivel 14.

A pair of laterally spaced guide rollers 24, 24 mounted on brackets 24a, 24a, projecting laterally from said reciprocating trough section adjacent the rear end thereof (see Figures 5 and 21), are provided to slidably support the reciprocating trough section 15 on the frame 11. Said rollers are rotatable about parallel spaced vertical axes and are provided with upper and lower facing frusto-conical surfaces adapted to engage V-shaped guide members 26, 26, herein shown as being angle irons (see Figure 21). Said angle irons are of a length slightly greater than the stroke of the conveyer and are mounted on and extend longitudinally along the frame 11, and when engaged by said rollers, form a support for the forward portion of said reciprocating trough section on said frame 11.

A pair of laterally spaced, upright bracket members 29, 29 are spaced forwardly of the guide members 26, 26 and form a mounting for rollers 30, 30, rotatable about parallel spaced vertical axes and adapted to engage the outer sides of the bearing plates 23, 23, to form a guide means for the extensible trough section 10 on the reciprocating trough section 15 (see Figures 3, 11 and 21). Bracket members 32, 32 project upwardly along opposite sides of said reciprocating trough section, at the forward end thereof, and form a mounting for a pair of vertically spaced flanged guide rollers 33, 33, journaled for rotation about transverse axes and adapted to engage the upper and lower sides of the bearing plates 23, 23, to form a slidable support for said extensible trough section and to prevent vertical displacement of said extensible trough section with respect to said reciprocating trough section.

The forward end of the reciprocating trough section 15 is thus reciprocably mounted in the frame 11 and forms a support for the extensible trough section 10, to permit said reciprocating trough section to reciprocate with respect to said extensible trough section, or to permit said extensible trough section to be extended from or retracted within said reciprocating trough section and to tilt with respect to said reciprocating trough section.

The mechanism for telescopically moving the extensible trough section 10 with respect to the reciprocating trough section 15 is generally indicated by reference character 27 and is pivotally mounted on a pair of parallel spaced side frame members 25, 25, extending along opposite sides of said reciprocating trough section and beyond the forward end thereof. Said side frame members are transversely pivoted to the reciprocating trough section 15, intermediate their ends, by means of pivotal pins 25a, 25a, mounted in bracket members 25b, 25b, projecting laterally from opposite sides of said trough section, adjacent the forward end thereof (see Figures 3, 5 and 6). Said side frame members besides forming a support for the feeding mechanism, also forms a slidable support for a floating frame 28, having pivotal and vertical slidable connection with the frame 11, and forming a non-reciprocating support for the control mechanism for the feeding mechanism.

The forward ends of the side frame members 25, 25 are slidably supported on the extensible trough section 10 by means of bracket members 35, 35, extending upwardly from the forward ends thereof. Each of said bracket members has a pair of vertically spaced flanged guide rollers 36, 36 mounted therein and adapted to engage the top and bottom surfaces of the bearing plates 23, 23, extending laterally from the upper outer sides of said extensible trough section.

The floating frame 28 is formed from a pair of laterally spaced supporting members 86 and 96, extending along opposite sides of the extensible trough section 10. Said supporting members form a non-reciprocating support for the mechanism for controlling the feeding mechanism and are connected together at their forward ends by a U-frame member 100, which extends transversely of the frame 11 beneath the extensible trough section 10, just ahead of the bracket members 35, 35. A vertically slotted guide member 87 projects upwardly from the rear end of each of said supporting members. The slots of said guide members have slidable engagement with blocks 88, 88 pivotally mounted on the upper ends of laterally spaced upright brackets 89, 89, extending upwardly from said frame 11 (see Figure 5).

The sliding connection between the floating frame 28 and the side frame members 25, 25 includes guiding members 90, 90, which project upwardly from the side frame members 25, 25 rearwardly of the bracket members 25b, 25b (see Figures 3, 5 and 11). Said guiding members have longitudinally extending facing guide grooves formed therein which have slidable engagement with the upper and lower sides of the supporting members 86 and 96, for holding the floating frame 28 in parallel relation with respect to the side frame members 25, 25 and the feeding mechanism supported by said side frame members. The forward ends of said side frame members have slidable supporting engagement with said supporting members by means of guide members 94, 94. Said guide members are supported by and project outwardly from the brackets 35, 35 and have slidable engagement with the upper and lower sides of the forward portions of the supporting members 86 and 96.

With reference now in particular to Figures 3, 4, 5 and 8 and the details of the feeding mechanism 27, friction grip blocks 40, 40 and 41, 41 are adapted to engage opposite sides of the bearing plates 23, 23 and are pivotally mounted in laterally spaced, vertically extending, rearwardly inclined carrier members 42, 42, disposed on opposite sides of the extensible trough section 10. The construction and operation of each of said carrier members and the means for moving said carrier members in position to cause said grip blocks to grip or be released from the bearing plates 23, 23, is the same for each side of said extensible trough section, so a description of said carrier members and gripping mechanism on one side of said extensible trough section will suffice for both sides of the device.

The carrier member 42 is urged in the position shown in Figures 3 and 4, to position the grip blocks 40 and 41 to grip the bearing plate 23 at the beginning of the forward or the return stroke of the conveyer, by means of a spring pressed link 44 having pivotal connection with the upper end of said carrier member and urging said end of said carrier member in a rearwardly inclined position, and a tension spring 45, connected with the lower end of said carrier member and pulling the forward end of said carrier member in a forward direction. Said spring pressed link is mounted in the upper portion of the bracket member 35 and includes a compression spring 47 encircling a link 48. Said compression spring is arranged to urge said link in a rearward direction and said link has pivotal connection with said carrier member, adjacent the upper forward end thereof. The tension spring 45 is connected to the lower end of said carrier member at one of its ends, and to an eye bolt 46 mounted adjacent the lower portion of said bracket member. It should here be noted that the only purpose of said spring pressed link and tension spring is to properly position the carrier member 42 so the grip blocks 40 and 41 will be in position to engage the bearing plate 23 at the beginning of the feeding stroke of the conveyer and to disengage said grip blocks at the end of said feeding stroke, and that the springs of said links are not strong enough to cause said grip blocks to grip said bearing plate with sufficient force to cause said extensible trough section to move with said reciprocating trough section.

A link 55 is provided to connect the upper end of the carrier member 42 with one side frame member 25 and the reciprocating trough section 15, and to exert a backward pulling force on the upper end of said carrier member, to engage the grip blocks 40 and 41 with the bearing plate 23, during the return stroke of the conveyer, to retract said extensible trough section. Said link has an eye bolt 56 threaded in its upper end, for adjustment, which is pivotally connected to an ear 57 projecting rearwardly from the upper end of said carrier member. Said link extends rearwardly and downwardly from the upper end of said carrier member and is provided with a bifurcated rear end portion, the furcations of which are longitudinally slotted, as indicated by reference character 58. Said slotted portions slidably engage spaced blocks 59, 59, pivotally mounted on a transversely extending shaft 60, which is mounted in opposite side frame members 25, 25.

The carrier member 42 is provided with a bifurcated depending ear 61, to which is pivotally connected a yieldable link generally indicated by reference character 64. Said yieldable link includes a threaded rod 62 having a flattened and enlarged forward end connecting portion 63, extending between the furcations of said ear and pivotally connected thereto. The forward end of said threaded rod is slidably mounted in a yoke 65, the furcations of which are longitudinally slotted, as indicated by reference character 66. Said slotted portions slidably engage opposite sides of a pair of spaced bearing blocks 67, 67, pivotally mounted on a transversely extending shaft 71 journaled in opposite side frame members 25, 25. A compression spring 68 is interposed between the forward end of said yoke and a collar 69, formed integral with the connecting portion 63. A nut 70 is threaded on the rear end of said threaded rod, to hold said rod in engagement with said yoke. The strength of the spring 68 is such that said link 64 is normally a solid member, but will yield, to permit release of the grip blocks 40 and 41 from the bearing plate 23, when the forward end of the shovel 13 engages an obstruction.

Since the spring pressed link 44 and the tension spring 45 are not strong enough to engage the grip blocks 40 and 41 with the bearing plate 23 with sufficient pressure to cause movement of the extensible trough with the reciprocating trough section, the grip blocks 40, 41 will move along the bearing plate 23 when the links 55 and 64 are slidably movable with respect to the shafts 60 and 71, as just described.

When the link 64 is held from slidable movement with respect to the shaft 71, and the link 55 is slidably movable with respect to the shaft 60, said link 64 will exert a pushing force against the lower end of the carrier member 42, during the forward stroke of the conveyer, to engage the friction grip blocks 40 and 41 with opposite sides of the bearing plate 23, and will exert a pulling force against the lower end of said carrier member, during the return stroke of the conveyer, to release said grip blocks from said bearing plate. This will extend said extensible trough section along said reciprocating trough section.

When the link 55 is held from slidable movement with respect to the shaft 60 and the link 64 is slidably movable with respect to the shaft 71, said link 55 will exert a pulling force on the upper end of the carrier member 42 during the return stroke of the conveyer, to engage the grip blocks 40 and 41 with opposite sides of the bearing plate 23, and will exert a pushing force on the upper end of said carrier member during the forward stroke of the conveyer, to release said grip blocks from said bearing plate. This will retract the extensible trough section within the reciprocating trough section.

The link 55 is selectively held from slidable movement with respect to its associated shaft 60 by means of a locking cam 73, secured to said shaft between the furcations of the bifurcated rear end portion of said link. Said locking cam has a curved engaging surface terminating into a depressed locking portion 73a, adapted to have locking engagement with a roller 74 mounted adjacent the rear end of said link, between the furcations thereof, and disposed rearwardly of the transverse shaft 60 (see Figure 6).

A locking cam 76, mounted on the transverse shaft 71, between the furcations of the yoke 65, is provided to selectively hold the link 64 from slidable movement with respect to said transmisverse shaft. Said locking cam has a curved engaging surface terminating into a depressed locking portion 76a adapted to have engagement with a roller 77, mounted in the yoke 65, between the furcations thereof, on a pivotal pin 78, disposed forwardly of the transverse shaft 71.

The means for positioning the locking cams 73 and 76 to have locking engagement with the respective rollers 74 and 77, to hold the respective links 55 and 64 from slidable movement with respect to the shafts 60 and 71, or to permit slidable movement of said links with respect to said shafts, includes a pair of laterally spaced dogs 79 and 80, mounted on the transverse shaft 60 adjacent one outer end thereof, and a pair of laterally spaced dogs 101 and 102 mounted on the transverse shaft 71 adjacent the end thereof opposite from the dogs 79 and 80 (see Figure 3). Said dogs 79 and 80 are adapted to be engaged by laterally spaced adjoining tripping cams 81 and 82, respectively. Said dogs 101 and 102 are adapted to be engaged by laterally spaced adjoining tripping cams 104 and 103, respectively (see Figures 7, 12, 15 and 16). Since the support members 86 and 96 are connected to the frame 11, which is connected with the base plate 16 of the swivel 14 through the connecting arms 17, 17 and 17b, 17b, there will be no reciprocable movement of said cams during reciprocable movement of the conveyer.

The tripping cams 81 and 82 are herein shown as having integrally formed, aligned, transversely extending shafts 84, 84a, extending from opposite sides thereof. Said shafts in turn are pivotally mounted in a box-like supporting structure 85, adjustably secured to the supporting and guiding member 86, intermediate its ends, by means of suitable cap screws, and are properly adjusted with respect to said supporting members and held in adjusted relation with respect thereto, by means of oppositely facing set screws 91, 91 (see Figure 3).

The tripping cams 103 and 104 are likewise shown as having integrally formed aligned transversely extending shafts 120, 120a extending from opposite ends thereof. Said shafts are pivotally mounted in a box-like supporting structure 105, secured to the supporting member 96 by means of suitable cap screws, and are properly adjusted and held in adjusted relation with respect to said supporting member by means of suitable cap screws 97, 97.

A hand lever 107 is provided to position the tripping cams 81 and 82, to engage the respective dogs 79 or 80 and move said dogs and the associated locking cam 73 to a locked or unlocked position with respect to the roller 74 (see Figures 4 and 9). Said hand lever is mounted in the U-frame 100 on the outer end of a sleeve 108, extending transversely across said U-frame and journaled therein. A hand lever 107a is mounted on the opposite end of said sleeve, to permit operation of said tripping cams from either side of the conveyer, a spring pressed link 106 is mounted in the U-frame 100 for longitudinal slidable movement with respect thereto, and has pivotal and slidable connection with a slotted portion of said hand lever, adjacent the lower end thereof, to urge said hand lever into the rearwardly inclined position shown in Figure 4, so said hand lever will normally be in a position to cause extension of said extensible trough section (see Figure 10).

The operating connection between the hand levers 107 and 107a and the tripping cams 81 and 82 comprises a yieldable link 109 (see Figures 3, 4, 5 and 10). Said link consists of a member 110 extending within a widened open portion 111 of said hand lever and pivotally connected to said hand lever within said open portion. Said member is open along its center and has a rearwardly extending sleeve 112 slidably mounted in the rearward end thereof (see Figure 10). A rod 113 is mounted in the forward end of said sleeve and projects forwardly therefrom and extends longitudinally through the open portion of said member and has a sleeve 113a secured to its forward end and slidably movable with respect to the member 110. A compression spring 114 encircles said rod and abuts collars 115, 115 freely mounted on said shaft and engaging opposite inner ends of said open portion, to permit yieldable movement of said shaft and rod in either a forward or rearward direction. A threaded shaft 116 is mounted in the rear end of said hollow shaft and its projecting rear end has a yoke 117 threaded thereon and locked in adjustment with respect thereto by means of a nut 118 (see Figure 6). A rocking arm 119 is secured to an outer end of the shaft 84, for rocking said shaft and the tripping cams 81 and 82. The free end of said rocking arm is pivotally connected between the furcations of the yoke 117 by means of a pin 121.

When the hand levers 107 and 107a are in the position shown in Figures 4 and 6 and the tripping cams 81 and 82 and dogs 79 and 80 are positioned as is shown in Figure 16, and the conveyer is reciprocably moving in a backward and forward direction, the outer tripping cam 82 will engage the outer dog 80 upon the forward stroke of the conveyer and pivot said dog in a clockwise direction, to move the depression 73a of the locking cam 73 into locking engagement with the roller 74, as is shown in Figures 5, 6 and 15. This will lock the link 55 from slidable movement with respect to the shaft 60 and cause said link to exert a pulling force on the upper end of the carrier member 42 and to engage the grip blocks 40 and 41 with the bearing plate 23 upon the return stroke of the conveyer.

When the hand lever 107 is moved in a counterclockwise direction to a position opposite from the position shown in Figures 4 and 5, the tripping cams 81 and 82 will be positioned as shown in Figure 15, to disengage the locking cam 73 from the roller 74 and permit the link 55 to slidably move with respect to the shaft 60. When in this position, the tripping cam 81 will engage the dog 79 during the forward stroke of the conveyer. This will pivot the two tripping cams in a clockwise direction against the compression spring 114, to permit said cams to pass beyond said dogs. During the return stroke of the conveyer, the cam 81 will engage the dog 79 and move said dog in a counterclockwise direction, as is indicated by dotted lines in Figure 15, to disengage the locking cam 73 from the roller 74.

It should here be noted that since the spring pressed link 106 urges the hand lever 107 into a rearwardly inclined position, that hand pressure must be maintained on said hand lever in order to release the link 55 for slidable movement with respect to the shaft 60.

A detent 122, mounted on the shaft 60, is adapted to be engaged by a leaf spring 123, for yieldably holding said shaft and the locking cam 73 in the desired positions of adjustment, as is indicated in Figures 13 and 14.

A similar detent 124 and leaf spring 125 are provided for yieldably holding the shaft 71 and locking cam 76 in the desired positions of adjustment (see Figure 7).

Positioning of the tripping cams 103 and 104 is controlled by means of hand levers 129 and 129a, mounted on opposite ends of a shaft 127, which extends through the sleeve 108. A tension spring 128 is provided to yieldably hold said hand lever in the inclined position shown in Figures 3 and 8 and hold the tripping cams in position to cause the link 64 to be locked from movement with respect to the shaft 71 (see Figures 3, 8 and 9). The actuating connection from the hand levers 129 and 129a to the tripping cams 103 and 104 is similar to the connection from the hand levers 107 and 107a to the tripping cams 81 and 82, so will not herein be described in detail. Said connection includes a yieldable link 130 similar to the yieldable link 109, but shorter than said link and pivotally connected to the hand lever 129 at one of its ends and having pivotal connection with a crank arm 131 on the shaft 120 at its opposite end (see Figures 3 and 8), for pivoting said shaft and the associated tripping cams 103 and 104.

When it is desired to retract the conveyer, the hand levers 129, 129a are moved in a clockwise direction against the spring 128, so the tripping cam 104 will engage the dog 101 during the forward stroke of the conveyer, to pivot the shaft 71 and locking cam 76 in a clockwise direction, and to release said locking cam from the roller 77 and permit the link 64 to slidably move with respect to the shaft 71. Upon release of said hand lever, the tripping cam 103 will be positioned to engage the dog 102 during the return stroke of the conveyer, to pivot the shaft 60 in a counterclockwise direction and move the locking portion 76a of the locking cam 76 into locking engagement with the roller 77.

Auxiliary holding grip blocks 133 and 134 are provided to prevent backward slipping movement of the extensible trough section 10 during extension of the conveyer, when the loading device is operating along an upwardly pitching grade. One set of said grip blocks is mounted in a carrier member 135 on each side of the conveyer, to engage opposite sides of the bearing plates 23, 23 (see Figures 2 and 3). Yieldable links 137 and 138, disposed above and below said bearing plates and pivotally connected with said carrier member at points coaxial with the pivotal axes of said grip blocks 133 and 134, respectively, are provided to connect said carrier members with the U-frame 100. The strength of the springs of said yieldable links is such that said links are relatively solid members during normal operation of the device.

The grip blocks 133, 134 are moved to a gripping position from the inoperative position shown in Figure 3, by means of hand levers 140, 140 mounted on opposite ends of a transversely extending shaft 141, journaled in the U-frame 100, adjacent the forward end thereof. The connection from said hand levers to each of said carrier members includes a crank arm 142, keyed on the shaft 141, and a link 143 connecting said crank arm with the lower end of said carrier member. The arrangement is such that movement of said hand levers and the lower end of said carrier member in a direction towards the forward end of the device will engage said grip blocks with the bearing plates 23, 23 to hold said extensible trough section from backward slipping movement during the return stroke of the conveyer.

An interlocking connection is provided between the hand levers 140, 140 and the hand levers 107 and 107a, to move said last mentioned hand levers to a position to cause the links 55, 55 to be slidably movable with respect to the shaft 60, whenever the hand levers 140, 140 are moved in a forward direction, and to prevent gripping of the bearing plates 23, 23 with said grip blocks when the two trough sections are reciprocably moving together. Said interlocking connection, as herein shown, includes a slotted link 145 having a pivotal connection with an arm 146 projecting inwardly from the hand lever 107. The slotted portion of said link has slidable and pivotal connection with the hand lever 140, to permit movement of the hand levers 107 and 107a to positions to release the locking cam 73 from the roller 74, but to prevent movement of the levers 140, 140 in a forward direction without moving the hand levers 107, 107a in the same direction, and moving the cams 81 and 82 in a position to permit the link 55 to slidably move with respect to the shaft 71.

Referring now in particular to Figures 22 to 25 inclusive and certain novel features of the swivel 14, said swivel, besides serving as a connection to control swinging movement of the reciprocating and extensible trough sections 15 and 10, while being reciprocably driven by drive mechanism on the end of the conveyer trough line, also serves to maintain the frame 11 in the proper relationship with respect to said reciprocating and extensible trough sections, so the rollers 24, 24 will not come out of engagement with the guide tracks 46, 46 and so the tripping cams 81, 82 and 104, 103 will engage the respective dogs 79, 80 and 101, 102 at the beginning of the forward or return strokes of the conveyer.

The cross frame member 18, secured to the rear ends of the arms 17b, 17b, is guided for lateral swinging movement in a transversely pivoted guide member 149 (see Figure 24). Said cross frame member has rearwardly extending, vertically spaced plates 147, 147 secured to opposite sides thereof which extend along the top and bottom sides of said guide member and are slidably movable with respect thereto in a transverse slot 152 formed in said guide member and in a longitudinally extending slot 153, disposed rearwardly of said transverse slot and extending along the central portion of said guide member (see Figure 23). A transverse shaft 151 pivotally connects the rear end of said guide member to the forward end of a supporting and positioning frame 150, which serves to connect the frame 11 to the base 16 and to hold said frame in the proper position with respect to said reciprocating trough section, in a manner which will more clearly appear as this specification proceeds.

The guiding connection between the plates 147, 147 and the guide member 149 consists of a block 154 slidably guided in the transverse slot 152 and connected with the plates 147, 147 by means of a pivotal pin 155, mounted at its ends in said plates. Likewise, a block 156 is slidably guided in the longitudinally extending slot 153 and is pivotally mounted on a pin 157, mounted at its ends in said plates 147, 147. The frame 11 is thus guided by the blocks 154 and 156, moving in the slots 152 and 153, for lateral swinging movement with respect thereto about a pair of parallel spaced axes, controlled by said slots to coincide with the axes of horizontal swinging movement of the connecting trough sections 19a and 15a, so said frame and reciprocating and extensible trough sections will move laterally in the same path.

The cross frame member 18 is slidably mounted on a pair of rollers 158, 158, rotatable about vertical axes and having V-shaped faces having engagement with inwardly facing V-shaped parallel spaced guide tracks 159, 159. Said guide tracks are mounted on bracket members 160, 160, secured to and extending outwardly and upwardly from opposite ends of said cross frame member. Said rollers are mounted on opposite ends of a plate 164 between the upper side of said plate and supporting members 165, 165 secured at their ends to said plate and extending over said rollers.

The plate 164 is secured to the lower end of a bearing boss 166, which bearing boss is secured to and depends from the lower end of the connecting trough section 15a, and pivots upon pivotal movement of said connecting trough section. Said plate and rollers thus pivot with said connecting trough section, and the guide tracks 159, 159 pivot in a similar path with the frame 11. Said bearing boss extends through a bearing 167 carried in a plate 168, extending across and secured to the bottom of the forward end of the intermediate trough section 19.

The centering and supporting frame 150 is provided with brackets 169, 169 projecting laterally and upwardly from opposite ends thereof, which form a support for longitudinally extending parallel spaced V-shaped guide tracks 170, 170, adapted to have slidable supporting engagement with rollers 171, 171, having V-shaped faces conforming to the form of said guides. Said rollers are mounted on the outer ends of bracket members 172, 172, secured to and projecting laterally beyond the ends of a plate 173 (see Figure 23). Said plate is secured to the bottom of the connecting trough section 19a and extends around a bearing member 174, encircling a bearing boss 175, depending from the rear end of the intermediate trough section 19 (see Figure 24).

The supporting and positioning frame 150 is slidably mounted on the base plate 16, for adjustment, to permit the frame 11 and tripping cams 81, 82 and 103, 104 to engage their respective dogs at the beginning of the forward or return stroke of the conveyer when desired, but is held in fixed relation with respect to said frame during the conveying operation. A pair of facing, laterally spaced angularly disposed gibs 176, 176 extend inwardly from the lower end of opposite side walls of the centering and supporting frame 150 and are adapted to be engaged by corresponding parallel spaced, angularly disposed retaining guides 177, 177, extending along said base plate. Tie bolts 178, 178 extend across the sides of said centering frame and are provided to draw the sides of said frame together and to engage said gibs with said retaining members, to clamp said centering frame in a stationary position during reciprocation of the conveyer.

The means for centering the frame 150 and properly positioning the frame 11 and feeding mechanism, to insure that the rollers 158, 158 engage the guide tracks 159, 159 and the rollers 24, 24 engage the guide tracks 26, 26 during the entire stroke of the conveyer and to insure that the tripping cams 81, 82 and 103, 104, engage their respective dogs at the beginning of the forward or return strokes of the conveyer, when desired, includes a centering member 179 connected with the trough section 19a and depending therefrom and adapted to engage either one of a pair of longitudinally spaced stops 184, 184 on a rearwardly projecting centering portion 185 of the centering and supporting frame 150, to move said frame to a position corresponding with the end of the forward or return strokes of the conveyer (see Figures 23 and 25). Said centering member is herein shown as having two spaced apart engaging ends 180, 180 adapted to engage the stops 184, 184 and extending along and slidably engaging opposite sides of a channeled guide member 183. An operating and guiding rod 181 projects rearwardly from the central portion of said centering member and is slidably mounted in a guiding bracket 182, which is mounted on and depends from the bottom of the connecting trough section 19a. Said channeled guide member 183 is secured to and depends from the connecting trough section 19a and the web thereof forms a slidable guide for the centering portion 185. Another channeled guide member 187 is spaced laterally from the guide member 183 and the web of this guide member slidably engages the opposite side of said centering portion.

The centering member 179 is urged in a direction away from the stops 184, 184 by means of a compression spring 189. A handle 190 on the end of the rod 181 is provided to move said centering member against said compression spring to a centering position. Said rod may be notched (not shown) for engagement with the guiding bracket 182, to hold said centering member in position.

The spacing between the insides of the stops 184, 184 and the outsides of the engaging ends 180, 180 of the centering member 179, when added together, is equal to the length of the stroke of the conveyer. Thus engagement of said centering member with either of said stops, upon reciprocation of the conveyer, will move the frame 150 with said centering member until the end of the stroke of the conveyer is reached. This will position said centering and supporting frame so said centering member will be midway between said stops at the center of the stroke of the conveyer and will move the frame 11 to a position whereby the tripping cams 81, 82 and 103, 104 will engage their respective dogs at the beginning of the forward or return strokes of the conveyer and the rollers 158, 158 and 24, 24 will engage their respective guide tracks during the entire stroke of the conveyer.

The use and operation of the device of my invention will be apparent from the following:

When the apparatus has been brought up to the working place and connected to the end of the shaker conveyer trough line, the base 16 is first held in position by means of jacks in the usual manner. The frame 150 should then be centered, to position the frame 11 so the tripping cams 81, 82 and 103, 104 will engage their respective dogs at the beginning of the forward and return strokes of the conveyer. This is done by loosening the tie bolts 178, 178 and moving the centering member 179 into position so either of its engaging portions may engage either of the stops 184, 184. The conveyer is then started, for centering, and stopped as soon as the centering operation has been completed. The frame 150 is then clamped to the base 16 by means of the tie bolts 178, 178.

The flexible draft devices 12, 12 being trained from the winding drums 12a, 12a on the base 16 forwardly along the frame 11, to the forward end thereof, may be trained around sheaves 195, 195 at the forward end of said frame, and connected to jacks 196, 196 at their free ends. The frame 11 and extensible trough section 10 may then be laterally moved along the mine floor by said draft devices, it being preferable to push one button to swing said frame and extensible trough section in one direction, and to push another button to reverse the direction of the motor 12 and swing said frame and extensible trough section in an opposite direction.

The extensible trough section may then be extended during swinging movement thereof, or while in a fixed position along the ground, for moving the shovel 13 into the broken down material, to gather said material, by moving the hand lever 107 in a forward direction against the spring pressed plunger 106. This will position the tripping cam 81 to engage the dog 79 during the return stroke of the conveyer, and will release the locking cams 73, 73 from the rollers 74, 74, and permit the links 55, 55 to slidably move with respect to the shaft 60 while the links 64, 64 remain in a locked position. Said links 64, 64 will thus exert a forward pushing force on the lower end of the carrier members 42, 42, during the forward stroke of the conveyer, and engage the grip blocks 40, 40 and 41, 41 with the bearing plates 23, 23, to move said extensible trough section forwardly with said reciprocating trough section, and will exert a pulling force against the lower end of said carrier member, during the return stroke of the conveyer, to disengage said grip blocks from said bearing plates. This will extend said extensible trough section along said reciprocating trough section.

When it is desired to retract the extensible trough section within the reciprocating trough section, the hand is released from the hand lever 107 and the hand lever 129 is moved in a clockwise direction against the spring 128 to a rearwardly inclined position, to position the tripping cam 104 to engage the dog 102 upon the forward strokes of the conveyer and pivotally move the locking cams 76, 76 in an upwardly or clockwise direction out of locking engagement with the rollers 77, 77 and permit the yieldable links 64, 64 to slidably move with respect to the shaft 71 on the blocks 67, 67. The instant the hand is released from the hand lever 107, the yieldable plunger 106 will move said hand lever to the rearwardly inclined position shown in Figures 3 and 4, and will position the tripping cam 82 to engage the dog 80 upon the forward strokes of the conveyer and rigidly connect the links 55, 55 with said transverse shaft, as has before been described. Said links 55, 55 will thus exert a pulling force on the upper end of the carrier members 42, 42 during the return strokes of the conveyer to engage the grip blocks 40 and 41 with the bearing plates 23, 23. Upon the forward strokes of the conveyer, said links will exert a pushing force against said carrier member, to release said grip blocks from said bearing plates and permit forward slidable movement of the reciprocating trough section with respect to the extensible trough section.

When it is desired to lock the trough sections 10 and 15 for reciprocable movement together, the hand is released from both of the hand levers 107 and 129 so the spring pressed links 106, 106 and tension springs 128, 128 will move said hand levers in a position to cause the respective tripping cams to lock the links 55, 55 and 64, 64 from movement with regard to their respective shafts.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a feeding device for shaker conveyers, a reciprocating trough section, an extensible trough section mounted for telescopic movement with respect to said reciprocating trough section, and means operable by the action of the conveyer for feeding said extensible trough section with respect to said reciprocating trough section including a carrier member, gripping means mounted on said carrier member and adapted to engage said extensible trough section during certain strokes of the conveyer, means selectively operable to automatically engage said gripping means with said extensible trough section, including a pair of links having pivotal connection with opposite ends of said carrier member and having slidable and pivotal connection with said reciprocating trough section, and means selectively operable to hold either of said links from slidable movement with respect to said reciprocating trough section to cause feeding movement of said extensible trough section in a forward or return direction.

2. In a feeding device for shaker conveyers, a reciprocating trough section, an extensible trough section mounted for telescopic movement with respect to said reciprocating trough section, and means operable by the action of the conveyer for feeding said extensible trough section with respect to said reciprocating trough section including a carrier member, gripping means mounted in said carrier member and adapted to engage said extensible trough section during certain strokes of the conveyer, means selectively operable to automatically engage said gripping means with said extensible trough section during the forword or return stroke of the conveyer including a pair of links having pivotal connection with opposite ends of said carrier member and having slidable and pivotal connection with said reciprocating trough section, and cam members selectively operable to hold either of said links from slidable movement with respect to said reciprocating trough section, to cause feeding movement of said extensible trough section in a forward or return direction.

3. In a feeding device for shaker conveyers, a reciprocating trough section, an extensible trough section mounted for telescopic movement with respect to said reciprocating trough section, and means operable by the action of the conveyer for feeding said extensible trough section with respect to said reciprocating trough section including a carrier member, gripping means mounted in said carrier member and adapted to engage said extensible trough section during certain strokes of the conveyer, means selectively operable to automatically engage said gripping means with said extensible trough section during the forward or return strokes of the conveyer including a pair of links having pivotal connection with opposite ends of said carrier member and having slidable and pivotal connection with said reciprocating trough section, means selectively operable to hold either of said links from slidable movement with respect to said reciprocating trough section, to cause feeding movement of said extensible trough section in a forward or return direction, including cam members adapted to be moved into engagement with said links, and means adapted to remain stationary during reciprocable movement of the conveyer, for selectively operating said cam members and moving them into engagement with said links.

4. In a feeding device for shaker conveyers, a reciprocating trough section, an extensible trough section mounted for telescopic movement with respect to said reciprocating trough section, and means operable by the action of the conveyer for feeding said extensible trough section with respect to said reciprocating trough section including a carrier member, gripping means mounted in said carrier member and adapted to engage said extensible trough section during certain strokes of the conveyer, means selectively operable to automatically engage said gripping means with said extensible trough section during the forward or return strokes of the conveyer including a pair of links having pivotal connection with opposite ends of said carrier member and having slidable and pivotal connection with said reciprocating trough section, and means selectively operable to hold either of said links from slidable movement with respect to said reciprocating trough section, to cause feeding movement of said extensible trough section in a forward or return direction including cam members adapted to be selectively moved into engagement with said links, and means adapted to remain stationary during reciprocable movement of the conveyer, for selectively moving said cam members into engagement with said links, including dogs having operative connection with said cam members and knock-off members adapted to engage said dogs.

5. In a feeding device for shaker conveyers, a reciprocating trough section, an extensible trough section mounted for telescopic movement with respect to said reciprocating trough section, and means operable by the action of the conveyer for feeding said extensible trough section with respect to said reciprocating trough section including a carrier member, gripping means mounted in said carrier member and adapted to engage said extensible trough section during certain strokes of the conveyer, means selectively operable to automatically engage said gripping means with said extensible trough section during the forward or return strokes of the conveyer including a pair of links having pivotal connection with opposite ends of said carrier member and having slidable and pivotal connection with said reciprocating trough section, means selectively operable to hold either of said links from slidable movement with respect to said reciprocating trough section including cam members adapted to be moved into engagement with said links, and means adapted to remain stationary during reciprocable movement of the conveyer, for selectively moving said cams into engagement with said links to cause feeding movement of said extensible trough section in either a forward or return direction including dogs having operative connection with said cam members, knock-off members adapted to engage said dogs, and hand levers so mounted as to be free from reciprocable movement during reciprocable movement of the conveyer, for positioning said knock-off members to engage said dogs.

6. In a feeding device for shaker conveyers, a frame member adapted to rest on the ground during reciprocation of the conveyer, another frame member mounted for reciprocable movement with respect to said first mentioned frame member, a reciprocating trough section mounted in said second mentioned frame member, an extensible trough section telescopically mounted with respect to said reciprocating trough section, means for feeding said extensible trough section relative to said reciprocating trough section including a pair of gripping members adapted to engage said extensible trough section during certain strokes of the conveyer, a pair of links connecting said gripping members with said reciprocating trough section, said links having pivotal and slidable connection with said reciprocating trough section, and means mounted on said stationary frame and selectively operable to cause either of said links to be held from slidable movement with respect to said reciprocating trough section, to effect extension or retraction of said extensible trough section at will.

7. In a feeding device for shaker conveyers, a frame member adapted to rest on the ground during reciprocation of the conveyer, another frame member mounted for reciprocable movement with respect to said first mentioned frame member, a reciprocating trough section mounted in said second mentioned frame member, an extensible trough section telescopically mounted with respect to said reciprocating trough section, means for feeding said extensible trough section relative to said reciprocating trough section including a pair of gripping members adapted to engage said extensible trough section during certain strokes of the conveyer, a pair of links connecting said gripping members with said reciprocating trough section and having pivotal and slidable connection with said reciprocating trough section, and means selectively operable to hold either of said links from slidable movement with respect to said reciprocating trough section, to effect extension or retraction of said extensible trough section at will including a manually operable hand lever on said stationary frame, and an operative connection between said hand lever and one of said means.

8. In a feeding device for shaker conveyers, a frame member adapted to rest on the ground during reciprocation of the conveyer, another frame member mounted for reciprocable movement with respect to said first mentioned frame member, a reciprocating trough section mounted on said second mentioned frame member, an extensible trough section telescopically mounted with respect to said reciprocating trough section, means for feeding said extensible trough section relative to said reciprocating trough section including a pair of gripping members adapted to engage said extensible trough section during certain strokes of the conveyer, a pair of links connecting said gripping members with said reciprocating trough section, said links having pivotal and slidable connection with said reciprocating trough section, and means selectively operable to hold either of said links from slidable movement with respect to said reciprocating trough section, to effect extension or retraction of said extensible trough section at will including a pair of manually operable hand levers on said stationary frame, and operative connections between said hand levers and said means.

9. In a feeding device for shaker conveyers, a frame member adapted to rest on the ground during reciprocation of the conveyer, another frame member mounted for reciprocable movement with respect to said first mentioned frame member, a reciprocating trough section mounted on said second mentioned frame member, an extensible trough section telescopically mounted with respect to said reciprocating trough section, means for extending or retracting said extensible trough section relative to said reciprocating trough section including a pair of gripping members adapted to engage said extensible trough section during certain strokes of the conveyer, a pair of links connecting said gripping members with said reciprocating trough section, said links having pivotal and slidable connection with said extensible trough section, and means selectively operable to rigidly connect either of said links with said reciprocating trough section, to effect extension or retraction of said extensible trough section at will including a pair of manually operable hand levers on said stationary frame, and operative connections between said hand levers and said means including dogs associated with each of said links, and tripping members on said stationary frame adapted to engage said dogs.

10. In a feeding device for shaker conveyers, a frame member adapted to rest on the ground during reciprocation of the conveyer, another frame member mounted for reciprocable movement with respect to said first mentioned frame member, a reciprocating trough section mounted on said second mentioned frame member, an extensible trough section telescopically mounted with respect to said reciprocating trough section, means for feeding said extensible trough section relative to said reciprocating trough section including a pair of gripping members, a pair of links connecting said gripping members with said reciprocating trough section, said links being pivotally and slidably mounted with respect to said extensible trough section, and means selectively operable to rigidly connect either of said links with said reciprocating trough section to effect extension or retraction of said extensible trough section at will including a pair of manually operable hand levers on said stationary frame, and operative connections between said hand levers and said means including a locking cam engageable with each of said links, a dog associated with each of said cams, for engaging said cams with said links, and means associated with said hand levers for actuating said dogs.

11. In a self-loading device for shaker conveyers, a supporting and guide frame adapted to rest on the ground and be held from reciprocable movement during reciprocation of the conveyer, another frame member mounted on said first mentioned frame member for reciprocable movement with respect thereto, a reciprocating trough section mounted on said other frame member, an extensible trough section telescopically mounted with respect to said reciprocating trough section, gripping means for extending or retracting said extensible trough section relative to said reciprocating trough section including a pair of gripping members having connection with said reciprocating trough section and adapted to engage said extensible trough section during certain strokes of the conveyer, a pair of links connecting said gripping members with said reciprocating trough section and having pivotal and slidable connection therewith, means mounted on said supporting and guide frame and selectively operable to cause either of said links to be held from slidable movement with respect to said reciprocating trough section, to effect extension or retraction of said extensible trough section at will, a mounting for said supporting and guide frame and said reciprocating and extensible trough sections, to permit lateral swinging movement thereof in a controlled path including a swivel having a base and a laterally swiveled trough section connected with the rear end of said reciproating trough section, a laterally swingable connection between the rear end of said supporting and guide frame and said base, and means for positioning said supporting and guide frame in such relation with respect to the stroke of the conveyer that said control means on said supporting and guide frame will act at the beginning of either the forward or return strokes of the conveyer.

12. In a self-loading device for shaker conveyers, a supporting and guide frame adapted to rest on the ground and be held from reciprocable movement during reciprocation of the conveyer, another frame member mounted for reciprocable movement with respect to said supporting and guide frame, a reciprocating trough section mounted on said second mentioned frame member, an extensible trough section, telescopically mounted with respect to said reciprocating trough section, gripping means adapted to engage said extensible trough section during certain strokes of the conveyer for extending or retracting said extensible trough section relative to said reciprocating trough section, a pair of links having pivotal and slidable connection with said reciprocating trough section, for connecting said gripping means with said reciprocating trough section, means mounted on said supporting and guide frame and selectively operable to cause either of said links to be held from slidable movement with respect to said reciprocating trough section, to effect extension or retraction of said extensible trough section at will, a mounting for said supporting and guide frame and reciprocating and extensible trough sections, to permit lateral swinging movement thereof in a controlled path including a swivel having a base and a laterally swiveled trough section mounted thereon and connected with the rear end of said reciprocating trough section, a laterally swingable connection between the rear end of said supporting and guide frame and said base, and means for positioning said supporting and guide frame in such relation with respect to the stroke of the conveyer that said control means on said supporting and guide frame will cause either of said links to be held from slidable movement with respect to said reciprocating trough section at the beginning of either the forward or return strokes of the conveyer including a centering frame slidably mounted on said base and having the rear end of said first mentioned frame pivotally connected thereto, a centering member reciprocably movable with the conveyer, spaced apart stops on said centering frame adapted to be engaged by said centering member during reciprocation of the conveyer, for moving said centering frame to such a position that said stops will be equidistantly spaced from said centering member at the center of the forward and return strokes of the conveyer.

13. In a self-loading device for shaker conveyers, a base, a swiveled trough section having one end supported on said base for lateral swinging movement with respect thereto, a reciprocating trough section connected to the opposite end of said swiveled trough section and having an extensible trough section telescopically mounted with respect thereto, a supporting and guiding connection between said reciprocating and extensible trough sections and said base including a frame extending along said reciprocating and extensible trough sections and connected to said base, for lateral swinging movement with respect thereto along the ground.

14. In a self-loading device for shaker conveyers, a base, a swiveled trough section having one end supported on said base for lateral swinging movement with respect thereto, a reciprocating trough section connected to the opposite end of said swiveled trough section and having an extensible trough section telescopically mounted with respect thereto, a supporting and guiding connection between said reciprocating and extensible trough sections and said base including a frame extending along said reciprocating and extensible trough sections and engaging opposite sides thereof, said frame being slidably movable along the ground adjacent its forward end and being connected to said base adjacent its rear end, for lateral swinging movement with respect thereto along the ground, and means reacting against said frame for swinging said frame and said reciprocating and extensible trough sections laterally with respect to said base.

15. In a self-loading device for shaker conveyers, a base, a swiveled trough section having one end supported on said base for lateral movement with respect thereto, a reciprocating trough section connected to the opposite end of said swiveled trough section and having an extensible trough section telescopically mounted with respect thereto, a supporting and guiding connection between said reciprocating and extensible trough sections and said base including a frame extending along said reciprocating and extensible trough sections and engaging opposite sides thereof, said frame being connected adjacent its rear end with said base, for lateral swinging movement with respect thereto, and having slidable engagement with the ground at its forward end, and means reacting against said frame, adjacent the forward end thereof, for swinging said frame and reciprocating and extensible trough sections laterally with respect to said base.

16. In a self-loading device for shaker conveyers, a base, a swiveled trough section having one end supported on said base for lateral movement with respect thereto, a reciprocating trough section connected to the opposite end of said swiveled trough section and having an extensible trough section telescopically mounted with respect thereto, a supporting and guiding connection between said reciprocating and extensible trough sections and said base including a frame extending along opposite sides of said trough sections and engaging opposite sides thereof, said frame being connected adjacent its rear end with said base, for lateral swinging movement with respect thereto, and having slidable engagement with the ground at its forward end, and means reacting against said frame, adjacent the forward end thereof, for swinging said frame and reciprocating and extensible trough sections laterally with respect to said base including a pair of winding drums mounted on said base, and having flexible cables trained therefrom and extending along opposite sides of said frame and extending laterally from said frame from points adjacent the forward end thereof.

17. In a self-loading device for shaker conveyers and in combination with a shaker conveyer trough line, a swivel including a base and a trough section connected to said base for lateral swinging movement with respect thereto, a reciprocating trough section connected to said swingable trough section, an extensible trough section telescopically mounted with respect to said reciprocating trough section, a supporting and guiding connection between said reciprocating and extensible trough sections and said base including a frame engageable with the ground at its forward end and connected adjacent its rear end to said base for lateral swinging movement with respect thereto, interengaging guide track and roller connections between said frame and reciprocating trough section for supporting said reciprocating trough section for reciprocable movement with respect to said frame, and means for positioning said frame in such relation with respect to the stroke of the conveyer that said guide track and roller connections will remain in slidable supporting engagement with each other during all parts of the stroke of the conveyer including a centering frame slidably mounted on said base and having the rear end of said first mentioned frame pivotally connected thereto, a centering member reciprocably movable with the conveyer, and spaced apart stops on said centering frame adapted to be engaged by said centering member during reciprocation of the conveyer for moving said centering frame to such a position that said stops will be equidistantly spaced from said centering member at the center of the forward and return strokes of the conveyer.

18. In a self-loading device for shaker conveyers and in combination with a shaker conveyer trough line, a swivel in said trough line including a base adapted to be held from movement with respect to the ground during reciprocation of the conveyer and having a reciprocably movable swiveled trough section connected to said base for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel upon lateral movement of said supporting means including a frame extending along and having guiding engagement with opposite sides of said extensible and reciprocating trough sections and mounted for slidable movement along the ground at its forward end and having lateral swinging connection with said base adjacent its rear end.

19. In a self-loading device for shaker conveyers and in combination with a shaker conveyer trough line, a swivel in said trough line including a base having a swiveled trough section connected thereto, for lateral swinging movement with respect thereto, a reciprocating trough section connected to the end of said swiveled trough section and having an extensible trough section telescopically mounted with respect thereto, a supporting and guiding connection between said base and said reciprocating and extensible trough sections, for guiding and swinging said trough sections laterally about said swivel including a frame mounted adjacent its rear end on said base for lateral swinging movement with respect thereto, and mounted adjacent its forward end for slidable movement along the ground, said frame having said reciprocating and extensible trough sections mounted thereon for reciprocable movement with respect thereto, and power means mounted on said base and having connection with said frame, for laterally swinging said frame and extensible and reciprocating trough sections.

20. In a self-loading device for shaker conveyers and in combination with a shaker conveyer trough line, a swivel in said trough line including a base having a swiveled trough section connected thereto, for lateral swinging movement with respect thereto, a reciprocating trough section connected to the end of said swiveled trough section and having an extensible trough section telescopically mounted with respect thereto, a supporting and guiding connection between said base and said reciprocating and extensible trough sections, for guiding and swinging said trough sections laterally about said swivel including a frame mounted adjacent its rear end on said base for lateral swinging movement with respect thereto and mounted adjacent its forward end for slidable movement along the ground, said frame having said reciprocating and extensible trough sections mounted thereon for reciprocable movement with respect thereto, and power means mounted on said base and reacting against the forward end of said frame, for laterally swinging said frame and extensible and reciprocating trough sections.

21. In a self-loading device for shaker conveyers and in combination with a shaker conveyer trough line, a swivel in said trough line including a base having a swiveled trough section connected thereto for lateral swinging movement with respect thereto, a reciprocating trough section connected to the end of said swiveled trough section, an extensible trough section adapted to be telescopically mounted with respect to said reciprocating trough section, a supporting and guiding connection between said reciprocating and extensible trough sections and said base, for guiding and swinging said trough sections laterally about said swivel during reciprocable movement thereof including a frame mounted adjacent its rear end on said base for lateral swinging movement with respect thereto and mounted adjacent its forward end for slidable movement along the ground, said frame having said reciprocating and extensible trough sections mounted thereon for reciprocable movement with respect thereto, and power means mounted on said base and reacting against the forward end of said frame, for swinging said frame and extensible and reciprocating trough sections laterally and including winding means having flexible cables trained therefrom and extending laterally from opposite sides of the forward end of said frame and secured to fixed abutments at their free ends.

22. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel upon lateral movement of said supporting means, including a frame mounted for slidable movement along the ground at its forward end and having lateral swinging connection with said base adjacent its rear end, feeding mechanism connected with said reciprocating trough section and adapted to have engagement with said extensible trough section during certain strokes of the conveyer, for extending or retracting said extensible trough section with respect to said reciprocating trough section, and means mounted on said frame and adapted to remain stationary during reciprocation of the conveyer, for controlling said feeding mechanism.

23. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel upon lateral movement of said supporting means, including a frame mounted for slidable movement along the ground at its forward end and having lateral swinging connection with said base adjacent its rear end, feeding mechanism connected with said reciprocating trough section and adapted to have engagement with said extensible trough section during certain strokes of the conveyer, for extending or retracting said extensible trough section with respect to said reciprocating trough section, and control means for said feeding mechanism mounted on said frame and adapted to remain stationary during reciprocation of the conveyer, said control means including a hand lever, a knock-off cam, and a dog mounted on said reciprocating trough section and adapted to be engaged by said knock-off cam.

24. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel including a frame mounted for slidable movement along the ground at its forward end and having lateral swinging connection with said base adjacent its rear end, feeding mechanism connected with said reciprocating trough section and adapted to have engagement with said extensible trough section during certain strokes of the conveyer, for extending or retracting said extensible trough section with respect to said reciprocating trough section, control means for said feeding mechanism mounted on said frame and adapted to remain stationary during reciprocation of the conveyer, and means for positioning said frame in such relation with respect to the stroke of the conveyer that said control means will position said feeding means to extend or retract said extensible trough section at the beginning of the forward or return stroke of the conveyer.

25. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel, upon lateral movement of said supporting means including a frame mounted for slidable movement along the ground at its forward end and having lateral swinging connection with said base adjacent its rear end, feeding mechanism connected with said reciprocating trough section and adapted to have engagement with said extensible trough section during certain strokes of the conveyer for extending or retracting said extensible trough section with respect to said reciprocating trough section, control means for said feeding mechanism mounted on said frame and adapted to remain stationary during reciprocation of the conveyer, and means for positioning said frame in such relation with respect to the stroke of the conveyer that said control means will position said feeding means to extend or retract said extensible trough section at the beginning of the forward or return stroke of the conveyer, including a centering frame slidably mounted on said base and having the rear end of said supporting and guide frame pivotally connected thereto, a centering member reciprocably movable with the conveyer, and spaced apart stops on said centering frame adapted to be engaged by said centering member during reciprocation of the conveyer, for moving said centering frame to such a position that said stops will be equidistantly spaced from said centering member at the center of the forward and return strokes of the conveyer.

26. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel, including a frame mounted for slidable movement along the ground at its forward end and having lateral swinging connection with said base adjacent its rear end, feeding mechanism connected with said reciprocating trough section and adapted to have engagement with said extensible trough section during certain strokes of the conveyer for extending or retracting said extensible trough section with respect to said reciprocating trough section, means for said feeding mechanism mounted on said frame and adapted to remain stationary during reciprocation of the conveyer, means for positioning said frame in such relation with respect to the stroke of the conveyer that said control means will position said feeding means to extend or retract said extensible trough section at the beginning of the forward or return stroke of the conveyer, including a centering frame slidably mounted on said base and having the rear end of said supporting and guide frame pivotally connected thereto, a centering member reciprocably movable with the conveyer, spaced apart stops on said centering frame adapted to be engaged by said centering member during reciprocation of the conveyer, for moving said centering frame to such a position that said stops will be equidistantly spaced from said centering member at the center of the forward and return strokes of the conveyer, and means for locking said centering frame from movement during reciprocation of the conveyer after the centering operation.

27. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel, including a frame mounted for slidable movement along the ground at its forward end and having lateral swinging connection with said base adjacent its rear end, feeding mechanism connected with said reciprocating trough section and adapted to have engagement with said extensible trough section during certain strokes of the conveyer, for extending or retracting said extensible trough section with respect to said reciprocating trough section, control means for said feeding mechanism mounted on said frame and adapted to remain stationary during reciprocation of the conveyer including a hand lever, a knock-off cam adapted to be controlled by said hand lever, and a dog mounted on said reciprocating trough section and adapted to be engaged by said cam, and means for positioning said frame in such relation with respect to the stroke of the conveyer that said knock-off cam will engage said dog at the proper part of the stroke of the conveyer.

28. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel including a frame mounted for slidable movement along the ground at its forward end and having lateral swinging connection with said base adjacent its rear end, feeding mechanism connected with said reciprocating trough section and adapted to have engagement with said extensible trough section during certain strokes of the conveyer, for extending or retracting said extensible trough section with respect to said reciprocating trough section, and control means for said feeding mechanism mounted on said frame and adapted to remain stationary during reciprocation of the conveyer including a hand lever, a knock-off cam controlled by said hand lever, and a dog mounted on said reciprocating trough section and adapted to be engaged by said cam, and means for positioning said frame in such relation with respect to the stroke of the conveyer that said knock-off cam will engage said dog at the proper part of the stroke of the conveyer including a centering frame slidably mounted on said base and having the rear end of said frame pivotally connected thereto, a centering member reciprocably movable with the conveyer, and spaced apart stops on said centering frame adapted to be engaged by said centering member during reciprocation of the conveyer for moving said centering frame to such a position that said stops will be equidistantly spaced from said centering member at the center of the forward and return strokes of the conveyer.

29. In a self-loading device for shaker conveyers, a swivel including a base adapted to be held from movement with respect to the ground during reciprocation of the conveyer and having a reciprocably movable swiveled trough section connected thereto for lateral swinging movement with respect thereto, a reciprocating trough section connected to the forward end of said swiveled trough section and having an extensible trough section telescopically mounted with respect thereto, and means for reciprocably supporting said reciprocating and extensible trough sections and laterally moving said trough sections about said swivel, including a frame mounted for slidable movement along the ground at its forward end and having lateral swinging connection with said base adjacent its rear end, feeding mechanism connected with said reciprocating trough section and adapted to have engagement with said extensible trough section, during certain strokes of the conveyer, for extending or retracting said extensible trough section with respect to said reciprocating trough section, control means for said feeding mechanism mounted on said frame and adapted to remain stationary during reciprocation of the conveyer, including a hand lever, a knock-off cam controlled by said hand lever, and a dog mounted on said reciprocating trough section and adapted to be engaged by said cam, and means for positioning said frame in such relation with respect to the stroke of the conveyer that said knock-off cam will engage said dog at the proper part of the stroke of the conveyer including a centering frame slidably mounted on said base and having the rear end of said supporting and guiding frame pivotally connected thereto, a centering member reciprocably movable with the conveyer, and spaced apart stops on said centering frame adapted to be engaged by said centering member during reciprocation of the conveyer for moving said centering frame to such a position that said stops will be equidistantly spaced from said centering member at the center of the forward and return strokes of the conveyer, and means for locking said centering frame from movement during reciprocation of the conveyer.

30. In a feeding device for shaker conveyers, a reciprocating trough section, an extensible trough section, and means operable by the action of the conveyer for moving said extensible trough section relative to said reciprocating trough section including a carrier member, gripping means mounted in said carrier member and adapted to engage said extensible trough section during certain strokes of the conveyer, means selectively operable to automatically engage said gripping means with said extensible trough section during the forward or return strokes of the conveyer including a pair of links having pivotal connection with opposite ends of said carrier member and having slidable connection with said reciprocating trough section, and means adapted to be moved into engagement with said links, for selectively holding either of said links from slidable movement with respect to said reciprocating trough section.

31. In a feeding device for shaker conveyers, a reciprocating trough section, an extensible trough section, and means operable by the action of the conveyer for moving said extensible trough section relative to said reciprocating trough section including a carrier member, gripping means mounted in said carrier member and adapted to engage said extensible trough section during certain strokes of the conveyer, means selectively operable to automatically engage said gripping means with said extensible trough section during the forward or return stroke of the conveyer including a pair of links having pivotal connection with opposite ends of said carrier member and having slidable connection with said reciprocating trough section, means adapted to be moved into engagement with said links, for selectively holding either of said links from slidable movement with respect to said reciprocating trough section, and means stationary during reciprocation of the conveyer adapted to move said engaging means into engaging position with said links.

32. In an articulated connection for a shaker conveyer trough line, a base, a driving trough section, a driven trough section, means for supporting a receiving end of said driving trough section for reciprocable movement with respect to said base, means for supporting a discharge end of said driven trough section for reciprocable movement with respect to said base, said last mentioned means being laterally movable with respect to said base, and a stationary guide member having guiding engagement with said last mentioned means, for causing said means to move in a controlled path about a pair of parallel spaced vertical axes.

33. In an articulated connection for a shaker conveyer trough line, a base, a driving trough section, a driven trough section, means for supporting a receiving end of said driving trough section for reciprocable movement with respect to said base, means for supporting a discharge end of said driven trough section for reciprocable movement with respect to said base, said last mentioned means being laterally movable with respect to said base, and means for causing said support means to move in a controlled path about a pair of parallel spaced vertical axes, including a guide member having a pair of perpendicular slots and guide means movable in said slots.

34. In a self-loading device for shaker conveyers, a frame, a reciprocating trough section guided for reciprocable movement with respect to said frame, an extensible trough section mounted for telescopic movement with respect to said reciprocating trough section, feeding mechanism connected with said reciprocating trough section for extending or retracting said extensible trough section with respect to said reciprocating trough section during certain strokes of the conveyer, and control means mounted on said frame and having selective operative connection with said feeding means so as to cause said feeding means to extend or retract said extensible trough section, for controlling operation of said feeding mechanism while held from reciprocable movement by said frame, during reciprocation of the conveyer.

35. In a self-loading device for shaker conveyers, a reciprocating trough section, a swiveled trough section connected thereto so as to permit lateral swinging movement of said reciprocating trough section, an extensible trough section mounted for telescopic movement with respect thereto, feeding means for telescopically moving said extensible trough section with respect to said reciprocating trough section, control means operatively connected with said feeding means and selectively operable to cause said feeding means to extend or retract said extensible trough section at will, and a frame having connection with said swivel and forming a non-reciprocating support for said control means.

LOY D. HAGENBOOK.